(Specimens.)
F. J. SEYMOUR.
PROCESS OF OBTAINING ALUMINIUM FROM ALUMINOUS ORES AND EARTHS.
No. 337,996. Patented Mar. 16, 1886.
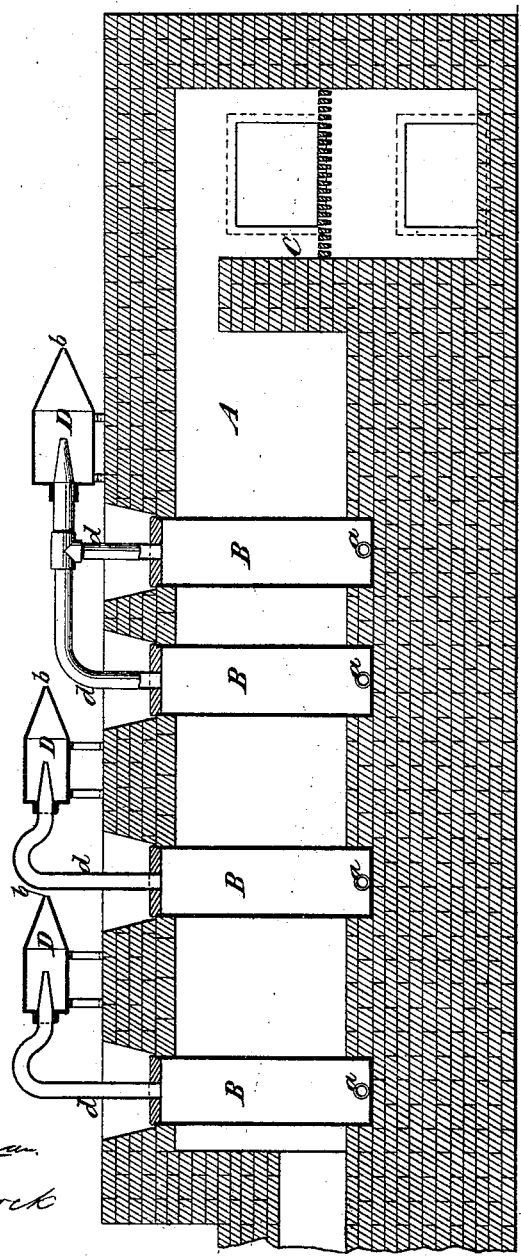

United States Patent Office.

FREDERICK J. SEYMOUR, OF WOLCOTTVILLE, CONNECTICUT, ASSIGNOR OF ONE-HALF TO WILLIAM HENRY BROWN, OF NEW YORK, N. Y.

PROCESS OF OBTAINING ALUMINIUM FROM ALUMINOUS ORES AND EARTHS.

SPECIFICATION forming part of Letters Patent No. 337,996, dated March 16, 1886.

Application filed March 2, 1885. Serial No. 157,444. (Specimens.)

*To all whom it may concern:*

Be it known that I, FREDERICK J. SEYMOUR, of Wolcottville, in the county of Litchfield and State of Connecticut, have invented a new and useful Improvement in Processes of Obtaining Aluminium from Aluminous Ores and Earths, of which the following is a specification, reference being had to the accompanying drawings.

In my United States Letters Patent No. 291,631, dated January 8, 1884, I have described and claimed a process consisting in subjecting a mixture of aluminous earth and an ore of zinc with carbonaceous material, and a flux to the action of heat in a close retort, whereby the zinc liberated is caused to produce or assist in the casting down of the aluminium in a metallic state.

Subsequent experiments with mixtures of aluminous ores and earths and ores of zinc for the purpose of obtaining the metal aluminium have led me to substitute for the close retort a retort having connected with it a condenser, and to so modify or change my process as to expel very considerable portions of the zinc and the aluminium from the retort in the form of vapors, which are condensed in the condenser in the form of a powder of a brownish, gray color, which consists of oxide of zinc, oxide of aluminium, and metallic zinc, and which, on being heated in a crucible with a small quantity of carbon, gives an alloy of zinc and aluminium, other portions of the zinc and aluminium remaining in the retort in the form of an alloy, which contains a smaller proportion of aluminium and a larger proportion of zinc than that obtained from the products condensed in the condenser.

My invention therefore consists, essentially, in mixing aluminous ores or earths with ores of zinc, and with carbonaceous matter and a flux, subjecting the said mixture to heat in a retort in which portions of the zinc and oxides of aluminium are vaporized, collecting and condensing the vapors in a condenser, and afterward subjecting the condensed products, together with carbonaceous matter, to heat, for the purpose of obtaining therefrom an alloy of the two metals.

Figures 1 and 2 in the accompanying drawings are vertical sections, at right angles to each other, of an apparatus which I employ to carry out my invention.

A is a furnace-chamber having set within it a series of upright retorts, B B, heated by the products of combustion from a fire-place, C, at one end of the chamber. Above this furnace are the condensers D D, of which there may be one for each retort, or one to serve for more than one retort, as shown in Fig. 1.

The retorts B B are represented of cylindrical form and set with their bottoms sunk a certain distance into the masonry of the bottom of the heating-chamber A, so their lower parts, and particularly the tubes $a\ a$, close to their bottoms, may be protected from the extreme heat of the chamber, to which nearly the whole of the exteriors of the retorts are subjected.

I propose, generally, to make the retorts of a kind of cast-steel which will stand an exceedingly high temperature without danger of fusion, such retorts requiring only for their protection a lining of some refractory material applied in the form of a wash. I have found well suited for this purpose a wash made with equal parts of quicklime and borax. These retorts are provided with removable covers B' B', which may be kept in place against such pressure of vapors as may be generated in the retorts by having suitable weights placed upon them. The protected tubes $a\ a$ of the retorts protrude through the exterior of the furnace-walls, so that the lower parts of the interiors of the retorts may be reached by rakes or other tools inserted through the said tubes by workmen outside the furnace while the latter is in operation, the said tubes being provided with suitable stoppers to close them when it is not required to manipulate the contents of the retorts.

The condensers may be of thin sheet metal, and are so supported above the furnace-chamber as to be exposed to the cooling influence of the atmosphere. They may be of any convenient form with a very small opening, $b$, for the escape of incondensable gases. The form represented is that of a horizontal cylinder having one end conical, and having the escape-opening $b$ at the apex of the cone. They are connected with the covers of the retorts or otherwise connected with the retorts near the upper parts thereof by pipes *d d*. When in use, they may be kept partly filled with water by any suitable means.

The aluminous ores and earths which may be treated according to this invention are various, but that which I have most successfully operated is kaolin, and the ores of zinc which I have used are the carbonates, and particularly the kind known as "calamine."

To prepare the materials for the process, the zinc ore is first roasted to expel the sulphur, and the kaolin or aluminous ore is dried. Both are pulverized, and then mixed with pulverized carbonaceous matter and a proper quantity of suitable flux or fluxes—as chloride of sodium and pearlash—is added.

The proportions of the aluminous ore or earth and zinc ore, as well as of the carbonaceous matter and the flux, may be considerably varied; but I have obtained the best results from the following proportions of the several matters, by weight: kaolin, fifty (50) parts; zinc ore, one hundred (100) parts; anthracite coal, one hundred and twenty-five (125) parts; chloride of sodium, ten (10) parts; pearlash, ten (10) parts. These are thoroughly mixed and placed in the retorts, which are then closed and heated to a temperature of about 2,500° Fahrenheit, which temperature is maintained for about twenty-four hours. In about eight hours the zinc and aluminium begin to distill and pass over into condensers in the form of vapors, which, being condensed, produce in the condensers a deposit in the form of a gray powder, which, on being withdrawn and mixed with about two to four per cent. of its own weight of carbon, and placed in a crucible and heated in an ordinary crucible-furnace, will yield an alloy of aluminium and zinc in which the metals will always be in very nearly the same proportions as the kaolin and calamine ore which were heated. The residuum in the retorts, which is withdrawn through the tubes *a*, will contain in globules from about a quarter-inch diameter to a microscopic size an alloy of zinc and aluminium in which the zinc is in larger proportion than the alloy obtained from the powder in the condensers.

By continuing the operation described in the retorts and condensers a longer time more of the metals may be obtained from the products collected in the condensers, and less will remain in the retorts, and by prolonging the operation nearly all of the metals may be caused to pass over into the condensers.

The furnace-chamber, instead of being heated by the combustion of solid fuel, as in the example represented, may be heated by the combustion of gaseous fuel.

Provision may be made for the introduction of hydrocarbon gases through the tubes *a a* into the retorts during the operation, to facilitate the operation of or extracting and expelling the metals.

The alloys of zinc and aluminium obtained by this process may be used in the arts as an alloy; or the metals may be separated in the manner described in my Letters Patent hereinabove referred to, or in any other suitable and convenient manner.

It may be understood by comparing this specification with that of my hereinbefore-mentioned Letters Patent, No. 291,631, that the present invention differs from that which is the subject of said Letters Patent, inasmuch as in that the ores of zinc and aluminium mixed with carbon are heated in a close retort in which the aluminium and zinc are cast down in a metallic state by a single heating, while according to the present invention the ores mixed with carbon are subjected to heat in a retort from which the oxides of the metal are expelled in the form of vapors, and these oxides are afterward heated with fresh carbonaceous matter in crucibles to reduce the metals. Although by the present process two operations are necessary, the yield of aluminium is greater, and greater economy results.

What I claim as my invention, and desire to secure by Letters Patent, is—

The process of extracting aluminium from aluminous ores and earths, consisting in subjecting such ore or earth with an ore of zinc, carbonaceous matter, and a flux to heat in a retort wherein the oxides of aluminium and zinc are vaporized, collecting and condensing the vapors in a condenser, and afterward subjecting the condensed product to heat with carbonaceous matter, substantially as herein described.

FREDK. J. SEYMOUR.

Witnesses:
JOHN WEITZ,
JAS. WEITZ.